May 17, 1966 R. R. RUDOLPH ETAL 3,251,298
METHOD AND APPARATUS FOR DECORATING GENERALLY
CYLINDRICAL WORKPIECES
Filed June 4, 1965 7 Sheets-Sheet 1

INVENTORS.
ROME R. RUDOLPH
CARL STRUTZ, JR. and
BY FRANK C. STRUTZ

ATTORNEY

May 17, 1966 R. R. RUDOLPH ETAL 3,251,298
METHOD AND APPARATUS FOR DECORATING GENERALLY
CYLINDRICAL WORKPIECES
Filed June 4, 1965 7 Sheets-Sheet 2

*INVENTORS*
ROME R. RUDOLPH
CARL STRUTZ, JR. and
BY FRANK C. STRUTZ

ATTORNEY

May 17, 1966

R. R. RUDOLPH ETAL  3,251,298
METHOD AND APPARATUS FOR DECORATING GENERALLY
CYLINDRICAL WORKPIECES

Filed June 4, 1965

*INVENTORS.*
ROME R. RUDOLPH
CARL STRUTZ, JR. and
FRANK C. STRUTZ
BY

*ATTORNEY*

INVENTORS
ROME R. RUDOLPH
CARL STRUTZ, JR. and
FRANK C. STRUTZ

ATTORNEY

Fig. 11

INVENTORS
ROME R. RUDOLPH
CARL STRUTZ, JR. and
FRANK C. STRUTZ
BY

ATTORNEY

INVENTORS
ROME R. RUDOLPH
CARL STRUTZ, JR. and
FRANK C. STRUTZ
BY

ATTORNEY

United States Patent Office 3,251,298
Patented May 17, 1966

3,251,298
METHOD AND APPARATUS FOR DECORATING GENERALLY CYLINDRICAL WORKPIECES
Rome R. Rudolph, 3258 Antler Drive, Gibsonia, Pa., and Carl Strutz, Jr., and Frank C. Strutz, both of Camp Tree Road, Mars, Pa.
Filed June 4, 1965, Ser. No. 461,373
31 Claims. (Cl. 101—40)

This invention relates to a method and apparatus for decorating generally cylindrical workpieces wherein the workpieces are conveyed continuously and in succession to one or more decorating screens for decoration, and more particularly to a method and apparatus for applying separate decorative imprints to different diameter body portions, such as the shoulder and the neck portion of bottles, simultaneously at one decorating station.

As is known, two types of decorating machines are available today, namely, the intermittent motion type decorating machine and the continuous motion type decorating machine.

In decorating apparatus of the intermittent motion type, a drive is provided which imparts intermittent traveling motion to the workpieces or bottles. That is to say, the bottles are moved in a stop-start fashion wherein the bottles are sequentially moved through a predetermined distance, stopped, moved again through said predetermined distance, stopped and so forth until each bottle has traveled completely through the apparatus. Decorating stations are provided at certain of those locations along the path of travel of the bottles at which the bottles come to a complete stop.

Each decorating station includes at least one decorating screen having a squeegee associated therewith which displaces the screen into line contact with the bottle. During a decorating operation, the bottle remains stationary with respect to the decorating station but is rotated about its longitudinal axis. The squeegee also remains stationary in alignment with the axis of the bottle. The screen, however, is passed or moved across the bottle while in rolling contact therewith. Examples of an intermittent motion type decorating machine will be found, for example, in U.S. Patent Nos. 2,231,535; 2,261,255; 2,721,516 and 3,146,704.

It is possible, in an intermittent motion type decorating machine, to decorate the body portion and the shoulder portion of the bottle simultaneously at one decorating station as shown, for example, in the above-cited U.S. Patent No. 2,261,255. This is accomplished by moving the body screen and the shoulder screen at substantially the same peripheral speed as the body and shoulder portions being decorated.

The intermittent motion type decorating machines described and illustrated in the above-cited U.S. patents operate completely satisfactory for decorating bottles. However, these machines have limited production rates. For example, certain embodiments of these machines can decorate one hundred twenty-five bottles per minute. In rare instances wherein exact timing is achieved, a production rate of one hundred fifty bottles per minute has been attained. Therefore, the one big disadvantage of intermittent motion type decorating machines is its relatively low production rate.

In decorating apparatus of the continuous motion type, bottles are conveyed through the apparatus at a constant linear speed (100 to 150 feet per minute). The bottles are brought continuously and in succession to each decorating station of the apparatus. Each decorating station comprises a decorating screen which remains stationary with respect to the decorating station and a squeegee which displaces the screen into line contact with the bottle being decorated. During a decorating operation, the squeegee is moved in the same direction and at the same velocity as the bottle being decorated. The bottle meanwhile is rotated about its longitudinal axis while in rolling contact with the stationary decorating screen. Examples of continuous motion type decorating machines will be found, for example, in U.S. Patents Nos. 2,027,102; 2,121,491 and 2,132,818, as well as in copending U.S. application Serial No. 303,019, filed August 19, 1963, and assigned to the assignee of the present invention.

The continuous motion type decorating machines of above-cited U.S. patents and of copending application Serial No. 303,019 operate completely satisfactory for decorating bottles. The production rate of the continuous motion decorating machine described in the aforesaid copending application Serial No. 303,019 has a production rate of from two hundred to about three hundred bottles per minute.

It is also possible to decorate the neck and body portions of a bottle on a continuous motion decorating machine. However, heretofore the decorating imprints had to be applied at two separate, spaced-apart decorating stations. That is to say, the body portion is decorated at one station and the neck portion is decorated at the next successive decorating station. When the decorative imprint is composed of two or more colors, the number of decorating stations, of course, is increased to correspond to the number of colors to be applied. More important, however, is the fact that two separate drive systems each having speed control apparatus are required to rotate the bottles at the two different angular velocities necessitated by the two different diameters of the neck and body portions. Furthermore, since a plurality of decorating stations are required to apply decorative imprints of one or more colors, it should be evident that a relatively long conveyor containing a large number of carriages is required in order to convey the bottles through the distance between and beyond the decorating stations. Thus, the large number of decorating stations, the relatively complicated control apparatus associated with the drive systems and the relatively large number of carriages required to convey the bottles, all contribute to the relatively high cost of continuous motion decorating apparatus.

Another disadvantage discovered in continuous motion decorating apparatus concerns the degree of alignment between the neck and base chucks employed in each cradle to support the bottle. As is known, each bottle must be registered to place the area to be decorated in a predetermined orientation with respect to the decorating screens. After registration, the orientation of the bottles with respect to the decorating screen must be maintained in order that the decorative imprints will be applied at a specified location on the body of the bottle.

It has been discovered that if the rotational axes of the neck chuck and the base chuck supporting the bottle are not coincident with the longitudinal axis of the bottle, a small amount of slippage occurs during each revolution of the bottle. Thus, in continuous motion decorating machines wherein the bottles are rotated continuously about their longitudinal axes, this small slippage is multiplied manifold so that when a bottle arrives at each of the decorating stations, the area to be decorated is not in exact registry with the decoration on the screen. This small amount of misalignment is not particularly noticeable when a decorative imprint of one color is applied. However, when decorative imprints of two or more colors are applied, any small amount of misalignment between the previously applied decorative imprint and the decorative imprint next to be applied is easily noticeable. Consequently, exceedingly exact tolerances are necessary in fabricating the bottle supporting carriages.

Accordingly, as an overall object, the present invention seeks to provide decorating apparatus of the continuous motion type wherein decorative imprints are applied simultaneously to the neck and bottle portions of the bottles.

Another object of the invention is to provide decorating apparatus of the continuous motion type wherein the neck and body portions of the bottles, which are of different diameters, are decorated simultaneously at one decorating station.

Still another object of the invention is to provide decorating apparatus of the continuous motion type wherein the bottles are rotated only during decoration and are stationary with respect to the supporting cradles during movement between decorating stations, thereby minimizing the loss in registration caused by misaligned neck and bottom chucks.

A further object of the invention is to provide decorating apparatus of the continuous motion type having an improved drive means which rotates the bottles only during decoration.

A further object of the invention is to provide decorating apparatus of the continuous motion type having various adjustments which permit bottles of different diameters to be decorated.

A still further object of the invention is to provide decorating apparatus of the continuous motion type having various adjustments which permit bottles having different body diameters and neck diameters to be decorated.

Still another object of the invention is to provide a novel method for decorating different diameter body portions of bottles simultaneously at one decorating station.

In accordance with the present invention, decorating apparatus of the continuous motion type is provided wherein a plurality of bottles are conveyed at a constant linear speed such that the bottles are brought continuously and in succession to one or more decorating stations. Each decorating station comprises two movable screens each having a movable squeegee associated therewith. The screens and the squeegees are supported in alignment with the path of travel of the neck and body portions of the bottles and for reciprocal movement parallel to the path of travel of the bottles. As is conventional, the squeegees displace the screens into line contact with the bottles being decorated. During a decorating operation, the squeegees are moved, in unison with the bottle being decorated, that is, at the same constant linear velocity and in the same direction. The bottle being decorated continues to move at the constant linear velocity and is simultaneously rotated about its longitudinal axis in a direction opposite to its travel. Each screen is moved independently of the other, at a velocity and in a direction relative to the bottle being decorated such that the screens are in rolling contact with the body portion being decorated. That is to say, the screens are moved so that there is no relative motion between the screens and the lines of the bottles in contact with the screens. At the completion of a decorating operation, that is, when one bottle has been decorated, the squeegees and the screens are moved back to their initial positions relative to one another in the interval of time necessary for an undecorated bottle to be brought to the decorating station.

In the present decorating apparatus, the bottles are rotated only during decoration and at a constant angular velocity. Inasmuch as the neck portion and the body portion of the bottle have different diameters, their corresponding peripheral or rim speeds also will be different. Therefore, means is provided by which the velocity of each screen may be varied as a function of the diameter of the body portion being decorated. Means also is provided for the screen which decorates the neck portion or small diameter portion of the bottle by which the direction of movement of this screen relative to the bottle may be varied. As will become apparent, the overall arrangement of the present decorating apparatus is such that the screen decorating the neck portion of the bottle will sometimes move in the same direction of the bottle, sometimes be stationary with respect to the bole and sometimes move in the opposite direction relative to the bottle. The velocity at which the neck decorating screen is moved is, of course, dependent on the peripheral speed of the neck portion of the bottle which, of course, is a function of its diameter.

The above and other objects and advantages of the present invention will become apparent from the following detailed description by reference to the accompanying drawings, in which.

*Decorating machine—General description*

Figure 1:
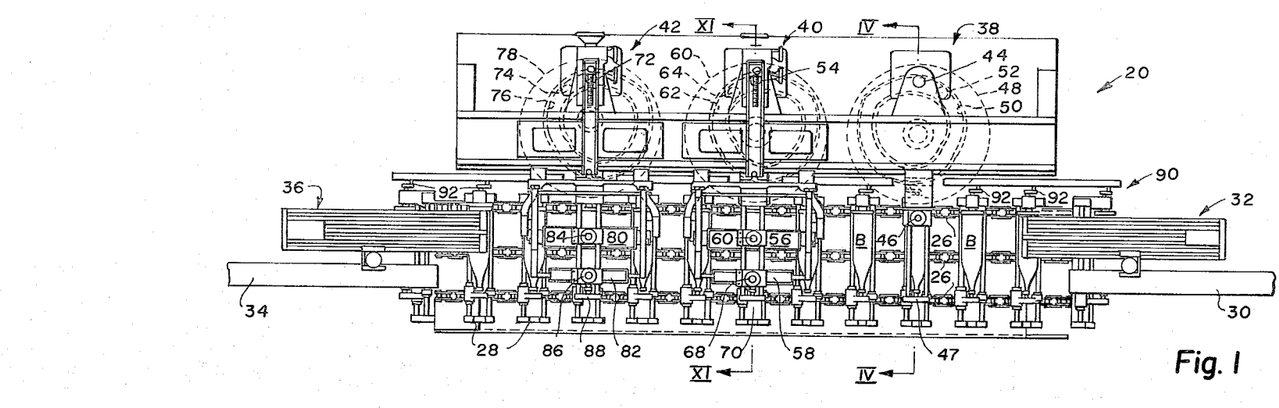
FIGURE 1 is an overall plan view of the present decorating machine.
Figure 2:
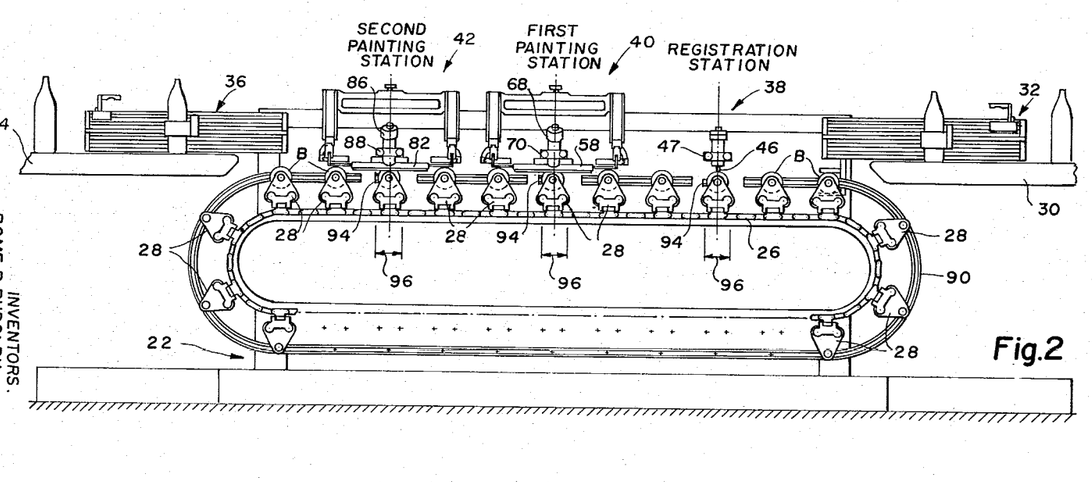
FIG. 2 is an overall front view of the present decorating machine.

Reference is now directed to FIGS. 1 and 2 wherein the overall arrangement of decorating machine 20 of the invention is illustrated. The decorating machine 20 comprises a base 22 supporting an endless conveyor 24 which conveys generally cylindrical workpieces, such as the bottles B, through the decorating machine 20. The endless conveyor 24 comprises a set of endless chains 26 having a plurality of workpiece support mechanisms 28 secured thereto at uniformly spaced points along its length. At the right end of the decorating machine 20 there is provided a feed conveyor 30 which conveys workpieces to a loading mechanism 32. At the left end of the decorating machine 20 there is provided a discharge conveyor 34 which receives decorated workpieces from an unloading mechanism 36.

The loading and unloading mechanisms 32, 36 are schematically illustrated herein. Although not limited thereto, the loading and unloading mechanisms 32, 36 preferably comprise that mechanism described and illustrated in copending application Serial No. 382,005, filed July 31, 1964, and assigned to the assignee of the present invention. For a complete description of the construction and operation of the loading and unloading mechanisms 32, 36, reference is directed to the aforesaid copending application Serial No. 382,005. However, for the purpose of the present invention, it will be sufficient to state that the loading mechanism 32, for example, grasps vertically oriented workpieces from the feed conveyor 30 and transfers the workpieces to the conveyor 24 while simultaneously changing the orientation of the workpiece from the vertical to the horizontal prior to depositing the workpiece on one of the workpiece support mechanisms 28. Conversely, the unloading mechanism 36 grasps horizontally oriented, decorated workpieces from the conveyor 24 and transfers them to the discharge conveyor 34 while simultaneously changing the orientation of the decorated workpiece from the horizontal to the vertical prior to depositing the decorated workpieces onto the discharge conveyor 34. As will become apparent from a study of the aforesaid copending application Serial No. 382,005, the loading and unloading mechanisms 32, 36 are high speed apparatus which are capable of loading and unloading up to about three hundred bottles per minute.

The decorating apparatus 20 has, as illustrated in FIGS. 1 and 2, a registration station 38 positioned adjacent to the loading apparatus 32; a first painting station 40 disposed downstream of the registration station 38; and a second painting station 42 disposed adjacent to the unloading apparatus 36.

The registration station 38 includes a first oscillating vertical drive shaft 44 which serves to reciprocate a registration finger 46 parallel to the movement of the bottles B as the bottles B are conveyed through the decorating apparatus 20 by means of the conveyor 24. At the registration station 38, bottles B are rotated about their longitudinal axes and stopped by means of the registration finger 46 in a predetermined orientation with respect to the decorating screens of the painting stations 40, 42. The first oscillating vertical drive shaft 44 is oscillated by a cam disc 48 having a cam track 50 provided thereon. The first vertical drive shaft 44 has rotatably secured thereto a cam roller 52 which resides within and is guided by the cam track 50. The cam disc 48 is rotated at a constant angular velocity in a counterclockwise direction so that the registration finger 46 moves with one of the bottles B (to the left of FIG. 1) during registration and thereafter returns to its initial position preparatory to the registering of the next successive one of the bottles B.

The first painting station 40 includes a second oscillating vertical drive shaft 54 which, as will be more fully described, serves for one thing to reciprocate a body screen 56 and a shoulder screen 58 parallel to the movement of the bottles B. The body screen 56 is employed to decorate the body portion of the bottles B while the shoulder screen 58 is employed to decorate the shoulder or neck portion of the bottles B. As will become apparent, the body and shoulder screens 56, 58 are reciprocated independently of one another and at velocities substantially equal to the rim speeds of the body and neck portions of the bottles B. The second oscillating vertical drive shaft 54 is oscillated by a cam disc 60 having a cam track 62 formed thereon. The second oscillating vertical drive shaft 54 has rotatably secured thereto a cam roller 64 which resides within and is guided by the cam track 50. In the first painting station 40, the cam disc 60 is rotated at the same constant angular velocity as the cam disc 50 but in a clockwise direction. Means, to be described, connects the body screen 56 to the second oscillating vertical drive shaft 54 whereby the body screen 56 is moved in a direction opposite to the travel of the bottles during decoration and then returned to its initial position preparatory to decorating the next successive one of the bottles B. The velocity at which the body screen 56 is moved is, of course, dependent on the diameter of the body portion of the bottles B. Means, also to be described, is provided for connecting the shoulder screen 58 to the second oscillating drive shaft 54 whereby the shoulder screen 58 may be moved either with or opposite to the travel of the bottles B or remain stationary during a decorating operation. The direction and velocity of the shoulder screen 58 is a function of the neck diameter of the bottles B.

The first painting station 40 also includes a pair of squeegees 66, 68 secured to a cantilever arm 70. The squeegee 66 is aligned with the body screen 56 while the squeegee 68 is aligned with the shoulder screen 58. The squeegees 66, 68 are employed to displace the body and shoulder screens 56, 58 into line contact with the bottle being decorated. Means, to be described, is employed for oscillating the cantilever arm 70 and, hence, the squeegees 66, 68 in a direction parallel with the path of travel of the bottles B.

The second painting station 42 includes a third oscillating vertical drive shaft 72 having rotatably secured thereto a cam roller 74 which is disposed in and guided by a cam track 76 provided on a cam disc 78. In the second painting station 42, the cam disc 78 is rotated in a clockwise direction and at the same constant angular velocity at which the cam discs 50 and 60 are rotated. The second painting station 42 also includes a body screen 80 and a shoulder screen 82. Means, to be described, is provided for independently connecting the body screen 80 and the shoulder screen 82 to the third oscillating vertical drive shaft 72. The body screen 80 is moved opposite to the direction of travel of the bottles B during a decorating operation. The velocity at which the body screen 80 is moved is dependent on the diameter of the body portion of the bottles B. The shoulder screen 82, however, may be moved either with or opposite to the travel of the bottles B or remain stationary during a decorating operation. The direction and velocity of the shoulder screen 82 are a function of the neck diameter of the bottles B. Associated with the second painting station 42 is a pair of squeegees 84, 86 secured to a support arm 88. The squeegees 84, 86 are reciprocated in a direction parallel to the path of travel of the bottles B and serve to displace the body and shoulder screens 80, 82 into line contact with the body portion and neck portion of the bottles being decorated.

Figures 9, 10:
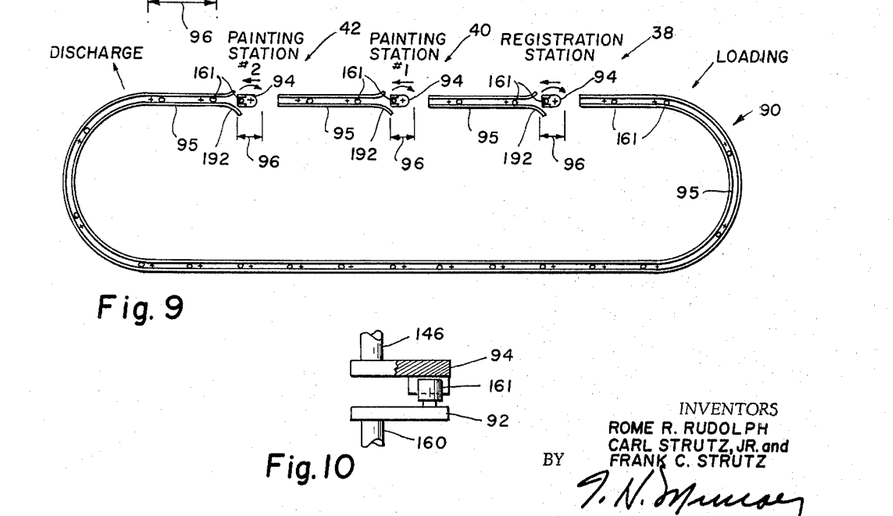
FIG. 9 is a side view illustrating a segmented track employed in guiding lever arms associated with each workpiece, into engagement with driving or movable segments of the track.
FIG. 10 is a view schematically illustrating the connection between a lever arm and a movable track segment of the segmented track of FIG. 9.

The decorating machine 20 is provided with a segmented track 90 best shown in FIGS. 2 and 9, which comprises three movable track segments 94 and a plurality of stationary track segments 95. The movable track segments 94 are positioned one at the registration station 38 and one at each of the decorating stations 40, 42. The stationary track segments 95 guide lever arms 92 (FIG. 1) into engagement with the movable track segments 94. The movable track segments 94 are employed to rotate each bottle during registration and decoration at each of the decorating stations 40, 42. Hence, in the decorating apparatus 20, the bottles B are rotated about their longitudinal axes once during registration and once during each decorating operation. At all other times, the bottles B remain stationary with respect to the workpiece supporting mechanism 28 by virtue of the fact that the lever arms 92 are engaged with the stationary portions of the segmented track 90.

In FIG. 2, a distance or length of bottle movement is illustrated by the dimension line 96. This distance 96 is the same for the registration station 38 and for both of the decorating stations 40, 42. It is to be noted that in the decorating apparatus 20, the registration and decoration are completed within the time interval required for the bottle B to move through the distance 96. Furthermore, the bottles B are rotated through 360° during their movement through the distance 96. As will become apparent later in the specification, the circumference of the body portion of the bottles B is normally greater than the distance 96 while the circumference of the neck portion of the bottles B may be greater than, equal to or less than the distance 96. In any event, the velocity of the body screens 56, 80 may be adjusted as a function of the diameter of the body portion to be decorated. Furthermore, the velocity and direction of travel of the shoulder screens 58, 82 may be adjusted as a function of the neck diameter of the bottles B. The overall arrangement is such that the body portion and the neck portion of the bottles may be decorated simultaneously at one decorating station. In the apparatus 20 illustrated in FIGS. 1 and 2, a first decorative imprint of one color is applied simultaneously to the neck and body portions of the bottles at the first painting station 40 and thereafter a second decorative imprint of a second color is applied simultaneously to the neck and body portions of the bottles at the second painting station 42.

Each of the movable track segments 94 is rotatably supported on a bottle rotating mechanism, not visible herein, which reciprocates through the distance 96. The bottle rotating mechanism serves to rotate each of the bottles B in a clockwise direction (as viewed in FIG. 2) during registration at the registration station 38 and during decoration at the first and second painting stations 40, 42. As will become apparent, the bottle rotating mechanism comprises a first portion which is movable with the bottles during rotation of the same and a rack member or second portion which is movable in the opposite direction and which serves to rotate the bottles B through 360° in the time interval required for the bottle to travel through the distance 96. The first portion of all the bottle rotating mechanisms, the registration finger 46 and all of the squeegees 66, 68, 84 and 86 are moved in unison and are driven by means of the first oscillating vertical shaft 44. The racks associated with each of the bottle rotating mechanisms are reciprocated by means of the second vertical oscillating shaft 54. As stated above, the body and shoulder screens 56, 58 of the first painting station 40 are reciprocated by the second oscillating vertical drive shaft 54 while the body and shoulder screens 80, 82 of the second painting station 42 are reciprocated by the third oscillating vertical drive shaft 72. In the decorating apparatus 20, the cam tracks 50, 62 and 76 have identical configurations. It is preferred, however, that the cam track 50 is a mirror image of the cam tracks 62 and 76 so that all of the cam discs 48, 60 and 78 are rotated in a clockwise direction.

*First oscillating vertical drive shaft 44*

Figure 3:
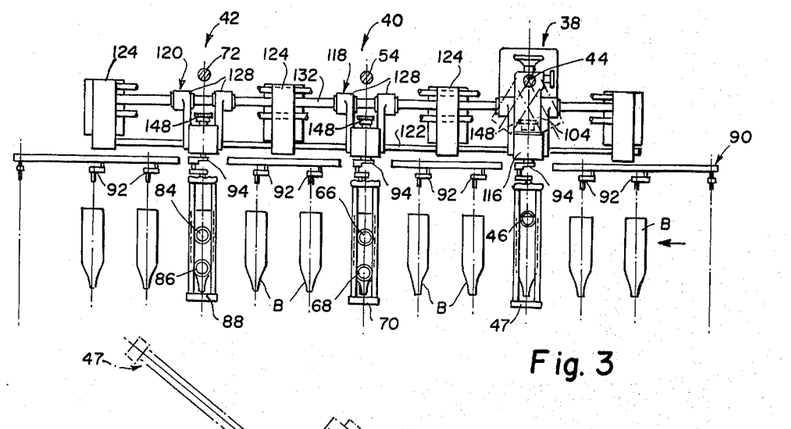
FIG. 3 is a fragmentary plan view, with parts omitted, illustrating unitary means for reciprocating a registration finger, all squeegees and all workpiece rotating mechanisms of the present decorating machine.
Figure 4:
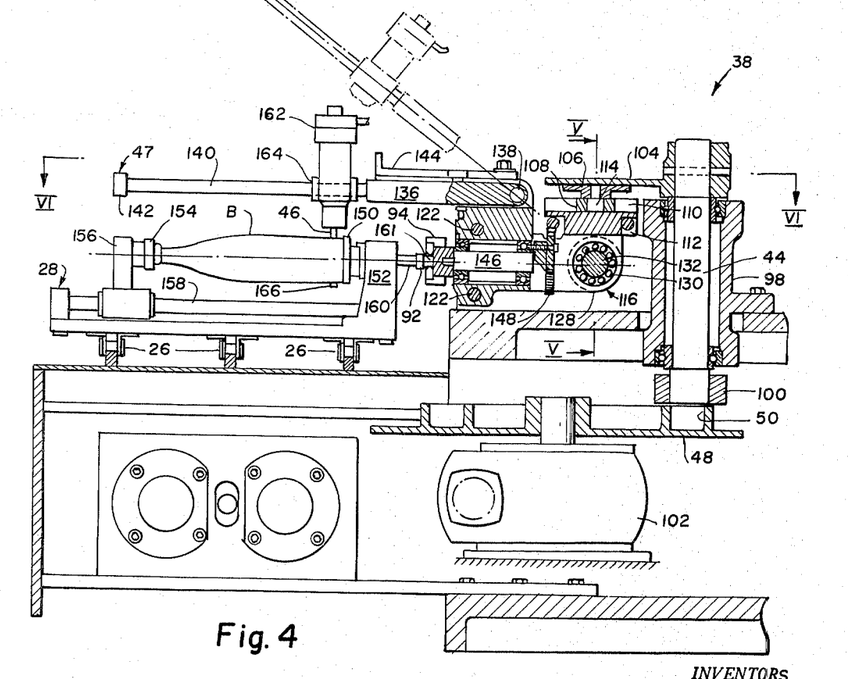
FIG. 4 is a cross-sectional view taken along the line IV—IV of FIG. 1.

Referring now to FIGS. 3 and 4, the first oscillating vertical drive shaft 44 is employed to reciprocate the registration finger 46, the squeegees 66, 68, 84 and 86; the cantilever arms 47, 70 and 88, and the first portion of the bottle rotating apparatus now to be described.

As can best be seen in FIG. 4, the first oscillating vertical drive shaft 44 is journaled to a housing 98 and is supported in a vertical position. Secured to the lower end of the drive shaft 44 is a rock arm 100 to which is rotatably secured the cam roller 52 (FIG. 1). The cam roller 52 (not visible herein) resides within and is guided by the cam track 50 of the cam disc 48. Drive means 102 is employed to rotate the cam disc 48 in a counterclockwise direction and at a constant angular velocity.

Secured to the upper end of the drive shaft 44 is an oscillating arm 104 having a socket member 106 secured to its lower face. The center of the socket member 106 is disposed at a predetermined radial distance from the center line of the drive shaft 44. The radial distance is such that as the oscillating arm 104 oscillates in the manner shown in FIG. 3, a chord connecting the extreme positions of the socket member will have a length equal to the distance 96 shown in FIG. 2. Directly beneath the socket member 106 is a connector block 108 which is slideable in a guideway 110 formed in a support block 112. A connecting pin 114 extends between and is rotatable in the socket member 106 and the connector block 108. As the oscillating arm 104 oscillates, the connector block 108 will move longitudinally through the guideway 110 while causing the support block 112 to undergo reciprocal motion in a direction normal to the plane of the drawing, i.e., parallel to the travel of the bottles.

As can best be seen in FIG. 3, three carriage members 116, 118 and 120 are provided one for the registration station 38 and one each for the first and second painting stations 40, 42. The carriage members 116–120 are connected by a pair of shafts 122 which is aligned in a vertical plane and are secured to each of the carriage members 116–120. At uniformly spaced points along the shafts 122 there are provided bearing blocks 124. The shafts 122 extend through journals such as ball bushings 126 (FIG. 6) which permit free sliding movement of the shafts 122 reciprocally through the bearing blocks 124. Each of the carriages 116–120 is provided with spaced cylindrical hubs 128 having journals such as ball bushings 130 (FIG. 5) retained therein. Extending through all of the ball bushings 130 and the bearing blocks 124 is a fixed large diameter shaft 132 which is secured to each of the bearing blocks 124, for example, by means of set screws 134.

It should be evident that as the first oscillating vertical drive shaft 44 oscillates back and forth, all of the carriage members 116–120 are reciprocated back and forth parallel to the path of travel of the bottles B and through the distance 96. The carriage members 116–120 support the cantilever arms 47, 70 and 88, and hence, the cantilever arms 47, 70 and 88 reciprocate with the carriage members 116–120.

Figure 5:
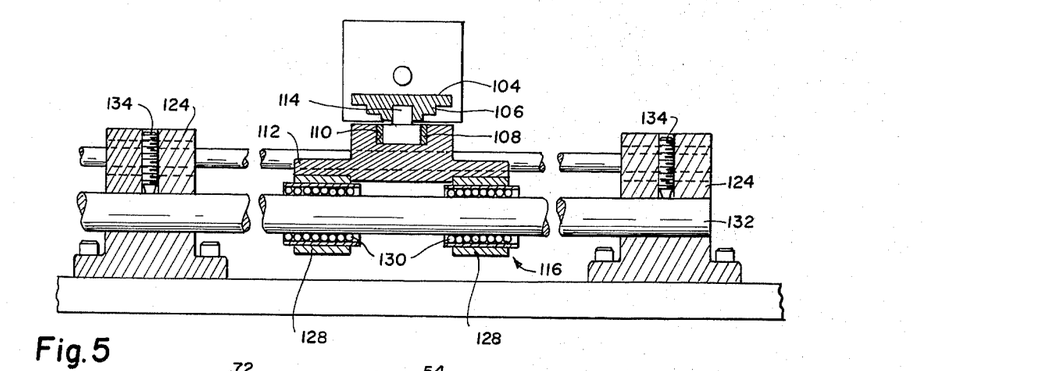
FIG. 5 is a cross-sectional view taken along the line V—V of FIG. 4.

As can best be seen in FIGS. 4 and 5, the cantilever arm 70 is shown comprising a plate member 136 having one of its ends pivotally secured as at 138 to the carriage member 116 and having a pair of spaced rods 140 projecting outwardly from its other end. A tie member 142 extends between and connects the ends of the rods 140. The carriage member 116 is provided with a locking arm 144 which is pivotal about a vertical axis from a locking position shown in full lines in FIG. 6 to a releasing position shown in dotted outline in FIG. 6. When the locking arm 144 is disposed in its releasing position, the cantilever arm 47 may be pivoted upwardly about the pivot point 138 into the raised position shown in dash-dot outline in FIG. 4. It should be noted at this time that the construction of the cantilever arms 70 and 88 is identical to the construction of the cantilever arm 47. Consequently, each of the cantilever arms 70 and 88 may be elevated and lowered as desired.

Figures 6, 8:
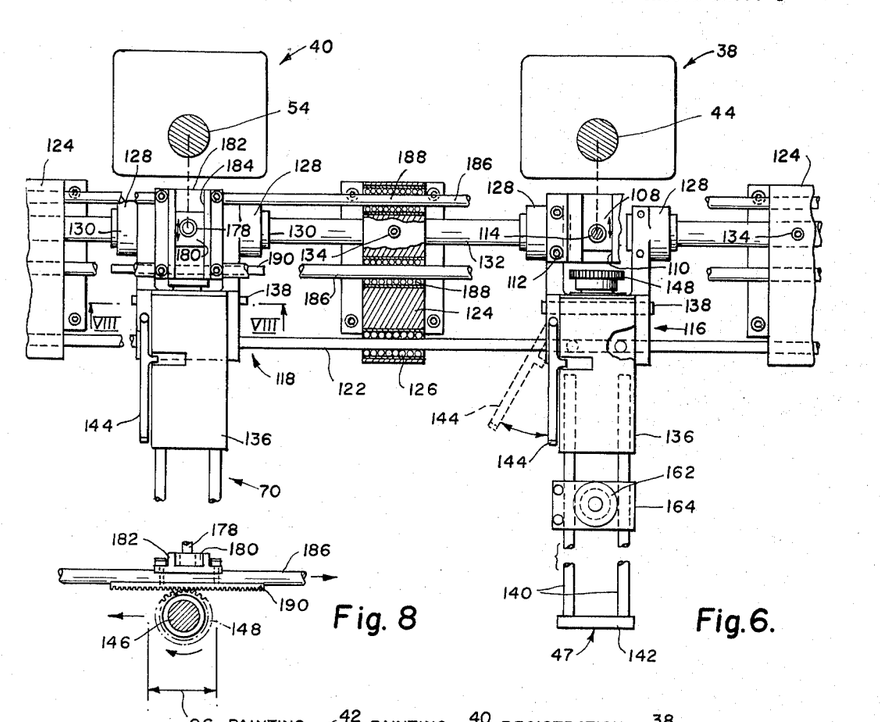
FIG. 6 is a fragmentary plan view as viewed from the line VI—VI of FIG. 4.
FIG. 8 is a fragmentary side view as viewed from the line VIII—VIII of FIG. 6.
Figure 7:
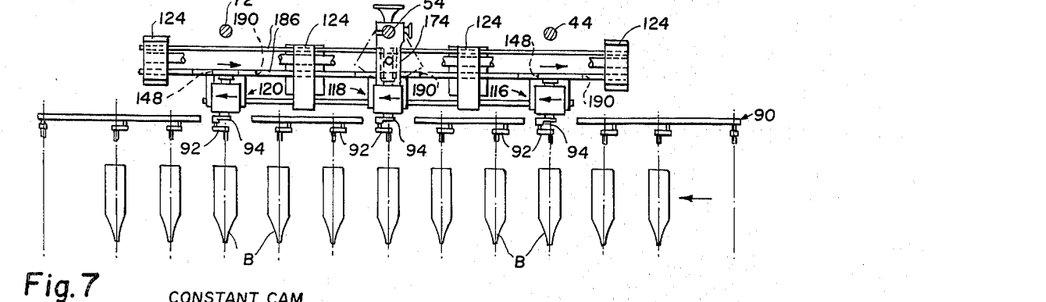
FIG. 7 is a fragmentary plan view, with parts omitted, illustrating means for reciprocating racks associated with the workpiece rotating mechanisms.

Referring now to FIGS. 3, 4 and 6, each of the carriage members 116–120 have a shaft 146 extending therethrough and journaled therein for rotation about an axis which is coincident with the longitudinal axis of the bottle B being decorated. The movable track segment 94 is secured to the conveyor side of the shaft 146 while a drive pinion 148 is secured to the opposite end of the drive shaft 146. As will be described the drive pinion 148 cooperates with a rack in rotating the bottle B through 360° while the bottle B traverses the distance 96 (FIG. 2).

The workpiece supporting mechanism 28 comprises a base chuck 150 rotatably supported on a stationary vertical standard 152, and a neck chuck 154 rotatably supported on a movable vertical standard 156. The movable vertical standard 156 is positionable along the length of a pair of support shafts 158 (only one visible) so that the distance between the base chuck 150 and the neck chuck 154 may be adjusted. Therefore, the workpiece supporting mechanism 28 is capable of supporting bottles of various lengths. Although not specifically illustrated, the movable vertical standard 156 is releasably secured to one of the shafts 158, which shaft is supported for reciprocal movement along its longitudinal axis. Therefore, at the feed end of the decorating machine 20, the neck chuck 154 is displaced away from the base chuck 150 to accept a bottle from the loading mechanism 32 and thereafter moved toward the base chuck 150 to clamp the bottle therebetween. The bottles are then carried through the decorating machine 20 to the discharge end of the decorating machine 20 whereupon the neck chuck 154 is again displaced away from the base chuck 150 to release the decorated bottle for conveyance by the unloading apparatus 32 (FIG. 1) to the discharge conveyor 34. Although not limited thereto, the workpiece supporting mechanism preferably comprises that workpiece supporting mechanism described and illustrated in copending application Serial No. 414,079, filed November 27, 1964, and assigned to the assignee of the present invention. For a complete description of the construction and operation of the workpiece supporting mechanisms 28, reference is directed to the aforesaid copending application Serial No. 414,079.

As can best be seen in FIG. 4, the base chuck 150 is connected to a shaft 160 which, in turn, projects beyond the stationary vertical standard 152. The cantilever arm 92 is secured to the end of the shaft 160. As shown in FIGS. 4 and 10, a roller 161 is rotatably secured to the free end of the lever arm 92 and is engaged in the movable track segment 94. When the movable track segment 94 is rotated, the bottle B is rotated through 360° during its travel through the distance 96 (FIG. 2).

FIG. 4 is a cross section taken through the registration station 38. As can be seen, the registration finger 46 is moved into and out of engagement with the bottle B preferably by means of a pneumatically operated cylinder 162. A complete description of the construction and operation of the cylinder 162 will be found in U.S. Patent No. 3,172,357, issued March 9, 1965, and assigned to the assignee of the present invention. Alternatively, any other suitable mechanism may be used to support and operate the registration finger 46. A support block 164 connects the pneumatically operated cylinder 162 to the cantilever arm 47 in a manner whereby the registration finger 46 may be elevated or lowered to place it at the desired distance from the bottle B.

In FIG. 4, the registration finger 46 is shown engaged with the base of the bottle B. To aid in registering the area of the bottle B to be decorated, with the decorating screens at the first and second decorating stations 40, 42, it is normal practice to provide a small projection or lug 166 on the bottle which is formed or cast therein at a suitable location, for example, near the base of the bottle B. The projection or lug 166 facilitates precise locating of the bottle for registration of single or successive decorative imprints. That is to say, the bottle B will be rotated in a counterclockwise direction until the lug 166 engages the registration finger 46. At that time, the bottle B will be stopped while the base chuck 150 continues to rotate while sliding over the bottom of the bottle B. When the base chuck 150 has completed its 360° rotation, the bottle areas to be decorated will be in exact registry with the designs on the screens 56, 58, 80 and 82. Thereafter, the registration finger 46 is lifted whereupon the pneumatically operated cylinder 162 is moved back to the starting point preparatory to the registration of the next successive one of the bottles B.

*Second oscillating vertical drive shaft 54*

As stated above, the second oscillating vertical drive shaft 54 serves to drive the body and shoulder screens 56, 58 of the first painting station 40 and the above-mentioned racks forming part of the bottle rotating mechanisms.

Figure 11:
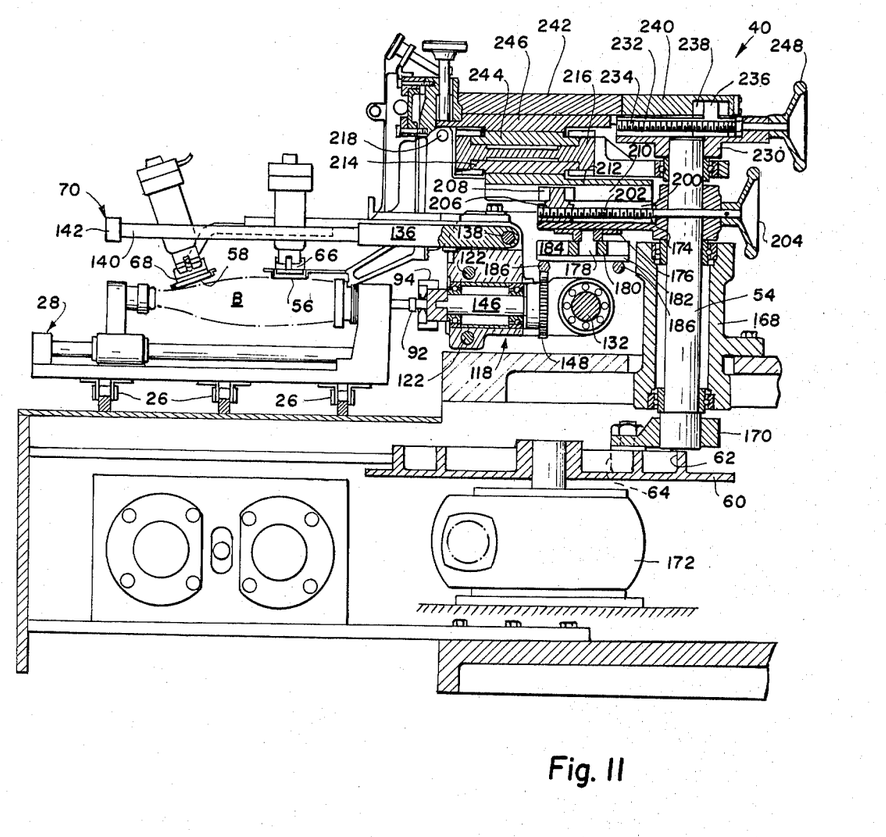
FIG. 11 is a cross-sectional view, taken along the line XI—XI of FIG. 1, illustrating the first decorating station.

In FIG. 11, the second oscillating vertical drive shaft 54 is shown journaled in a housing 168 for oscillation about a vertical axis. At the lower end of the second drive shaft 54 there is secured a rock arm 170 to which is rotatably secured the cam roller 64. The cam roller 64 is disposed within and is guided by the cam track 62 of the cam disc 60. Drive means 172 is employed to rotate the cam disc 60 in a clockwise direction and at a constant angular velocity. As the cam disc 60 rotates, the cam roller 64 will follow the path of the cam track 62 thereby causing the second drive shaft 54 to oscillate through an angle of 60°.

An oscillating arm 174 is secured to the second drive shaft 54 and projects radially therefrom. A socket member 176 is secured to the lower face of the oscillating arm 174 and has rotatably disposed therein a connecting pin 178. The connecting pin 178 extends into and is rotatable in a support block 180 which, in turn, is slideable in a guideway 184 formed in a support member 182. The center of the socket member is displaced radially from the central axis of the second drive shaft 54 by a distance such that when the socket member oscillates through 60°, a chord connecting the extreme positions of the socket member will have a length equal to the distance 96 (FIG. 2). Therefore, as the oscillating shaft 174 oscillates through 60°, the support block 180 will move reciprocally and parallel to the path of travel of the bottles B through a distance equal to the distance 96 (FIG. 2).

*Bottle rotating mechanism*

As stated above, the pinion 148 is rotated by means of a rack whereby the bottles are rotated through 360° during their travel through the distance 96. To complete the description of the bottle rotating mechanism components, reference is now directed to FIGS. 6, 8 and 11.

The support block or drive member 182 is secured to a pair of rods 186 which are aligned in a horizontal plane and extend through all of the support blocks 124. As can be seen in FIG. 6, each of the support blocks 124 is provided with a journal such as ball bushings 188 which support the rods 186 for free longitudinal sliding movement. Three racks 190 are secured at spaced points along one of the rods 186. Specifically, one of the racks is positioned in meshing relation with each of the drive pinions 148 associated with each of the carriage members 116–120. The length of each of the racks 190 is preferably slightly greater than the circumference of the pinion 148. Therefore, when the rack 190 is moved in a direction to the right of FIG. 8 through the distance 96 and the pinion 148 is moved in a direction to the left of FIG. 8 through the same distance 96, the pinion 148 will be rotated through exactly 360°. It should be evident then that at the registration station, and both of the decorating stations 40, 42, each bottle being registered and decorated will be moved through the distance 96 while simultaneously being rotated through exactly 360°. The operation of the bottle rotating mechanism will be fully discribed later in the specification with reference to FIGS. 12A–12G.

*Segmented track 90*

Reference is now directed to FIG. 9 wherein the segmented track 90 is schematically illustrated. As can be seen, the rollers 161 associated with the lever arms 92 are guided by the stationary track segments 95 into engagement with the movable track segments 94. A fish mouth 192 is provided at the entrance end of each of the stationary track segments 95 to guide the rollers 161 into the stationary track segments 95. Therefore, when a bottle is deposited on a workpiece support mechanism at the loading point of the decorating apparatus 20, the bottle will remain stationary with respect to the support mechanism from the loading point to the registration station, from the registration station to the first painting station, from the first painting station to the second painting station, and from the second painting station to the discharge point. However, during its travel through the registration station 38 and each of the decorating stations 40 and 42, the bottle will be rotated through exactly 360° while moving through the distance indicated at 96.

An object of the present invention is to provide decorating apparatus of the continuous motion type wherein the loss in registration associated with misaligned neck and bottom chucks is minimized. It should be evident from FIG. 9, that once the bottle has been registered at the registration station 38, the bottle is rotated only twice during its travel through the decorating apparatus 20. That is, the bottle is rotated once at the first painting station and a second time at the second painting station. It should be obvious then that the slight loss in registration associated with misaligned neck and bottom chucks is considerably minimized by the present mode of operation.

*Operation of bottle rotating mechanism*

Reference is now directed to FIGS. 12A–12G wherein the progress of the movable track segment 94 is illustrated during its simultaneous linear travel and clockwise rotation.

Figure 12A:
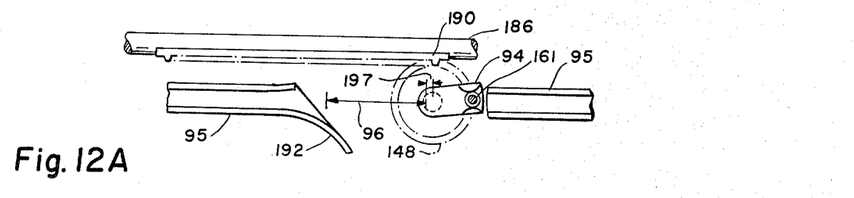
FIGS. 12A–12G are views which illustrate the operation of the bottle rotating mechanism employed in the present decorating machine.
Figure 12B:
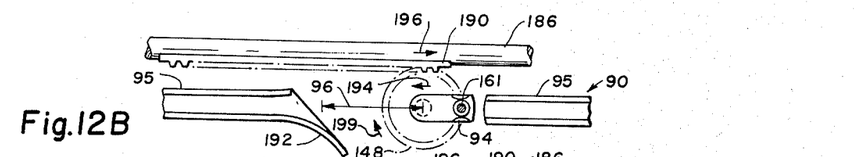
Figures 12C, 12D, 12E, 12F:
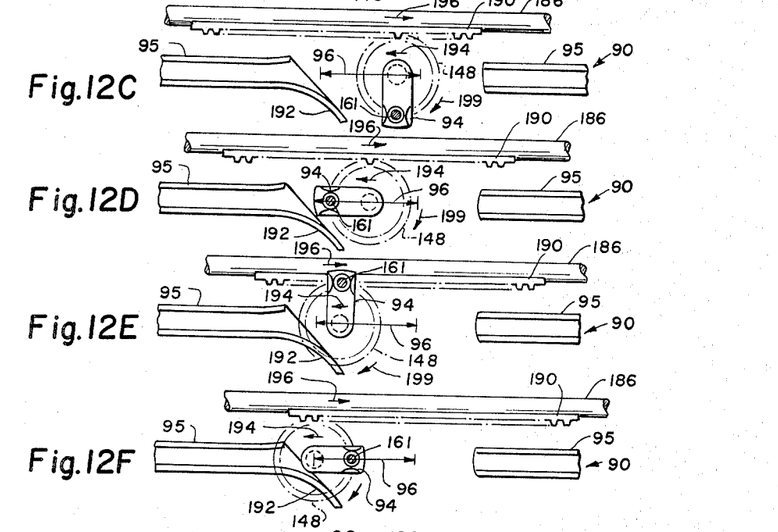

In FIG. 12A, the roller 161 associated with the bottle being decorated, is shown engaged with the movable track segment 94 prior to the start of a decorating operation. The drive pinion 148 is engaged with one end of the rack 190. The rack 190 is shown displaced to the left of FIG. 12A. During the decorating operation, the movable track segment 94 and the drive pinion 148 are moved at a constant linear velocity by the oscillating arm 104 (FIG. 4) while the rack 190 is moved at the same constant linear velocity by the oscillating arm 174 (FIG. 11), as described above. The direciton of linear movement of the movable track segment 94 and the drive pinion 148 during a decorating operation is indicated in FIGS. 12B–12F by the arrow 194 while the movement of the rack 190 is indicated by the arrow 196.

Figure 12G:
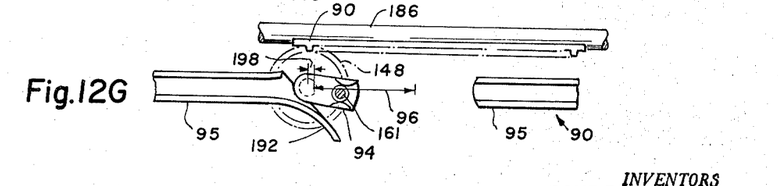

In FIG. 12A, the center of the drive pinion 148 is displaced to the right of the starting point of the distance 96 by a small distance indicated at 197. In FIG. 12G, the center of the drive pinion 148 is displaced to the left of the terminating point of the distance 96 by a small distance indicated at 198. The small distances 197 and 198 represent overtravel of the drive pinion 148 which overtravel permits the bottles to be rotated through 360° at a constant angular velocity while being moved through the distance 96 at a constant linear velocity, regardless of the neck and body diameters of the bottle being decorated.

In FIG. 12A, the movable track segment 94 is illustrated at a position corresponding the end of its return travel, i.e., to the right of FIG. 12A and will begin to rotate in a clockwise direction and move to the left when the drive pinion 148 is moved to the left. During movement of the movable track segment 94 between the positions illustrated in FIGS. 12A and 12B, i.e., through the small distance 197, it is quickly accelerated to the constant linear velocity at which the roller 161 is traveling. Thereafter and until the movable track segment traverses the distance 96, it will move at that constant linear velocity. When, however, the movable track segment reaches that position illustrated in FIG. 12G, it will be quickly decelerated to a complete stop in the time interval required for it to move to the position illustrated in FIG. 12F, i.e., through the small distance 198. Thereafter, the above-described cycle will be repeated but in the reverse order so that the movable track segment 94 will be returned to its initial position as illustrated in FIG. 12A, preparatory to its rotating the next successive bottle.

It will become apparent by comparing FIGS. 12B–12F, that since the rack 190 and the drive pinion 148 are moved in opposite directions at substantially equivalent velocities, the drive pinion, and hence the bottles, will be rotated at a constant angular velocity. Furthermore, since the length of the rack 190 is greater than the circumference of the drive pinion 148, the drive pinion 148 and, hence the bottles, will be rotated through 360°.

*Cam track curves*

Figure 13:
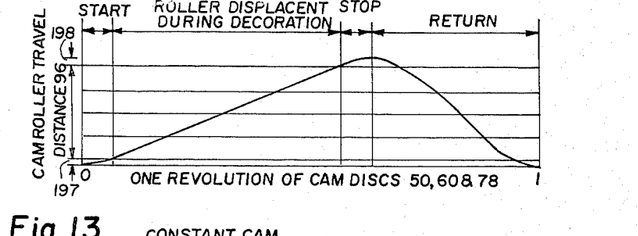
FIG. 13 is a graph wherein the cam roller travel is plotted against one revolution of the cam track.
Figure 14:
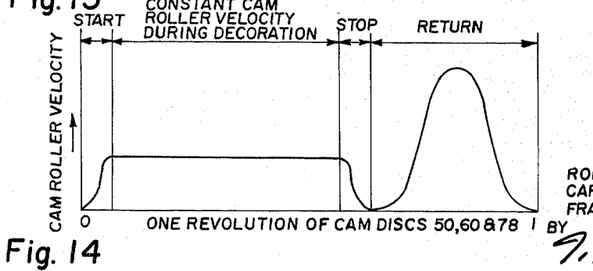
FIG. 14 is a graph wherein the cam roller velocity is plotted against one revolution of the cam track.

FIGS. 13 and 14 are commonly known as cam curves. FIG. 13 is a plot of cam roller travel or chord displacement versus one revolution of the cam track. FIG. 14 is a plot of the cam roller velocity versus one revolution of the cam track. Both plots are divided into four regions, namely, Start; Decoration; Stop and Return.

Comparing FIGS. 13 and 14, it will be seen in the Start region, the cam roller undergoes differential displacement through the small distance 197 while being quickly accelerated from zero velocity to a preselected constant velocity. During decoration (Decoration region), the cam roller undergoes a constant displacement through the distance 90 and is moved at a constant velocity. Thereafter, the cam roller undergoes differential displacement through the distance 198 (Stop region) while being quickly decelerated from the constant velocity to zero velocity.

During its return stroke (Return region), the cam roller undergoes differential displacement through the distances 198, 96 and 197 while being accelerated to a maximum velocity at substantially the midpoint of its return stroke and then decelerated from the maximum velocity to zero velocity.

The above-described cam roller motion applies to the cam rollers 52, 64 and 74 and is produced by the configuration of the cam tracks 50, 62 and 76. Furthermore, it is to be understood that the motions of the cam rollers 52, 64 and 74 are duplicated by the elements driven thereby, i.e., the registration finger 46; the squeegees 66, 68, 84 and 86; the decorating screens 56, 58, 80 and 82; and the drive pinions 148; the racks 190 and the movable track segments 94 comprising the bottle rotating mechanisms.

*Body screen drive mechanism*

Figure 15:
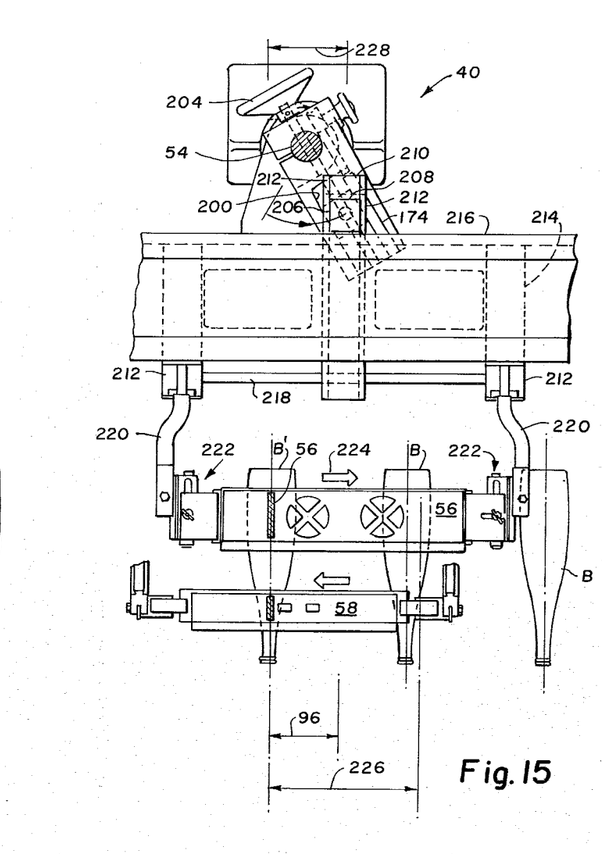
FIG. 15 is a fragmentary plan view illustrating a body screen drive mechanism.

Reference is now directed to FIGS. 11 and 15 for a description of the drive mechanism employed in oscillating the body screens 56 and 80 of the first and second painting stations 40, 42. FIGS. 11 and 15 are illustrative of the first painting station 40. It should be understood, however, that the drive means now to be described applies equally as well to the drive means of the second painting station 42.

Referring now in particular to FIG. 11, the oscillating arm 174 is provided with a guideway 200 formed in its upper face. An adjusting shaft 202 extends through the second drive shaft 54 and through the guideway 200. The adjusting shaft 202 is provided with a handwheel 204 by which the adjusting shaft 202 is rotated in either a clockwise or a counterclockwise direction. Threaded onto the adjusting shaft 202 and slideable along the guideway 200 is a block 206 which extends into engagement with a connecting block 208. The connecting block 208 is slideable longitudinally through a guideway 210 provided in a connecting bar 212. The connecting bar 212 is secured to a slide bar 214 which is slideable longitudinally of the decorating apparatus 20 and supported by a supporting beam 216 which extends throughout the length of the decorating apparatus 20. It should be evident, that when the second drive shaft 54 is oscillated, the slide bar 214 will undergo reciprocal movement longitudinally of the decorating apparatus 20, that is, parallel to the travel of the bottles. It should also be evident that the distance through which the slide bar 214 reciprocates is dependent on the radial distance of the connecting block 208 from the central axis of the second drive shaft 54. Hence, rotation of the handwheel 204 in the appropriate direction will cause the block 206 to advance toward or recede from the drive shaft 54 thereby changing the distance through which the slide bar 214 reciprocates.

Referring now to FIGS. 11 and 15, the slide bar 214 is provided with additional connecting bars 212, one at each of its ends. All of the connecting bars 212 project forwardly of the support beam 216 and are connected by means of a rod 218. Projecting forwardly of the end connecting bars 212 are screen support arms 220 between which the body decorating screen 56 is secured. As is conventional, the screen support arms 220 may be elevated or lowered so as to position the body screen 56 at the desired distance from a bottle. As is conventional, adjusting means 222 are provided at each end of each screen support arm 220 for aligning the body screen 56 with the path of travel of the areas of the bottles B which are to be decorated.

In FIG. 15, the relative positions of the body screen 56 and the bottle B′ correspond to the positions they would occupy at the termination of a decorating operation. That is to say, the body screen 56 has traveled to the right of FIG. 15, as indicated by the arrow 224, and is now in its extreme right-hand position. Similarly, the bottle B′ has traveled to the left of FIG. 15 through the distance 96 while simultaneously being rotated through 360°. The circumference of the body portion of the bottle B′ is such that the length of the design on the decorating screen 56 is equal, for example, to a dimension indicated by the dimension line 226. Since the bottle B′ has traveled only through the distance 96, the distance through which the body screen 56 must travel is the difference the distance 96 and the dimension 226. Furthermore, since the bottle B′ travels to the left of FIG. 15 through the distance 96, the body screen 56 must move in the opposite direction through a distance equal to the difference between the distance 96 and the dimension 226. Hence, with the block 206 at the appropriate distance from the drive shaft 54, the body screen 56 will reciprocate through a distance indicated at 228, which distance 228 is equal to the difference between the distance 96 and the dimension 226.

The arrangement of the body screen drive is such that the body screen 56 will be moved at a velocity such that there is no relative motion between the body screen 56 and the line of the bottle B in contact with the body screen 56. It should be remembered at this time that all bottles are rotated at the same angular velocity and move through the same distance 96 regardless of their diameters. Consequently, a bottle having a diameter larger than the bottle B′ will have a greater rim speed and, of course, a greater circumference. In this instance, the body screen 56 will have to be moved through a shorter distance. Adjustment in the length of screen travel would be accomplished by turning the handwheel 204 so as to move the block 206 toward the second drive shaft 54. This adjustment provides the block 206 with a shorter radius with respect to the shaft 54 and hence a shorter linear travel between its extreme positions of arcuate movement. The shorter length of screen travel taken in conjunction with the linear movement of the bottle, provides an automatic adjustment in the speed of the body screen 56 such that the bottle will be in rolling contact with the body screen 56. Conversely, a bottle having a smaller diameter than the bottle B′, will have a lesser rim speed and, of course, a lesser circumference. In this instance, the body screen 56 will have to be moved through a greater distance. Adjustment in the length of screen travel would be accomplished by turning the handwheel 204 so as to move the block 206 away from the second drive shaft 54. This adjustment provides the block 206 with a greater radius with respect to the shaft 54 and, hence, a greater linear travel between its extreme positions of arcuate movement. The greater length of screen travel taken together with the linear movement of the bottle, provide an automatic adjustment in the speed of the body screen 56 such that the bottle will be in rolling contact with the body screen 56.

Although not specifically illustrated herein, a scale plate would be provided having scale markings corresponding to various body diameters. A pointer would be associated with the block 206 which would be aligned with the appropriate one of the scale markings in correspondence with the body diameter of the bottle to be decorated.

Shoulder screen drive mechanism

Figure 16:
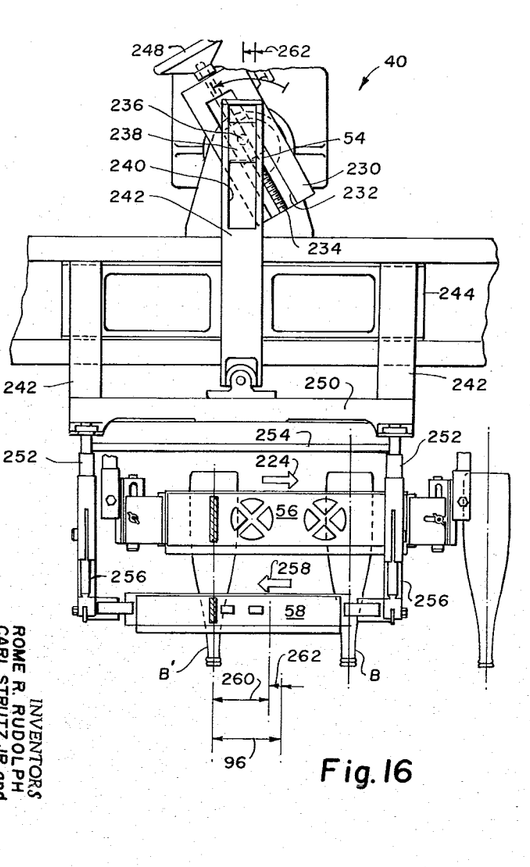
FIG. 16 is a fragmentary plan view illustrating a shoulder screen drive mechanism.

Reference is now directed to FIGS. 11 and 16 for a description of the mechanism employed in oscillating the shoulder screen 58. It is to be understood at this time that the mechanism now to be described pertains to the first decorating station 40 and applied equally as well to the second decorating station 42.

Referring now in particular to FIG. 11, an oscillating arm 230 is secured to the upper end of the shaft 54 for oscillation therewith. The oscillating arm 230 is provided with a guideway 232 through which extends adjusting shaft 234. Threaded onto the adjusting shaft 234 is a block 236 which is slideable within the guideway 232 and extends upwardly into and is rotatably connected to a connecting block 238. The connecting block 238 is slideable in a guideway 240 provided in a connecting bar 242 which is connected to a slide bar 244 by means of an intermediate connecting bar 246. The slide bar 244 is slideable longitudinally of the decorating apparatus 20 in the supporting beam 216 in the same manner as the slide bar 214 described above.

It should be noted at this time that the adjusting shaft 234 extends to the left of as well as to the right of the center line of the drive shaft 54. Hence, as viewed in FIG. 11, the block 236 and the connecting block 238 may be positioned to the right, in alignment with or to the left of shaft 54 by rotating the adjusting shaft 234 in the appropriate direction by means of a handwheel 248 secured thereto. Accordingly, the connecting bar 242 may be made to move with the bottle during decoration by placing the connecting block 238 on the right-hand side of FIG. 11. Furthermore, the connecting bar 242 may be made to move opposite to the movement of the bottles during decoration by placing the connecting block 238 to the left of the drive shaft 54. Still further, the connecting bar 242 may be held stationary by placing the central axis of the connecting block 236 in alignment with the central axis of the second drive shaft 54. The purpose of this construction will become apparent later in the specification when the mode of moving the shoulder screen 58 is described.

Reference is now directed in particular to FIG. 16. Two additional connecting bars 242 are provided, one at each end of the slide bar 244. Connecting the front ends of the connecting bars 242 is a frame 250. Screen support arms 252 are connected together by means of a rod 254 and are each releasably secured to one end of the frame 250 and slideable vertical to provide for elevating and lowering the shoulder screen 58 to position the same adjacent to the neck portion of the bottle. Projecting forwardly of the screen support arms 252 are extension arms 256 between which the shoulder screen 58 is secured. The extension arms 256 are movable toward and away from the frame 250 so as to position the shoulder screen 58 along the length of the bottle to be decorated.

In FIG. 16, the relative positions of the shoulder screen 58 and the bottle B′ correspond to those positions which these elements have at the termination of a decorating operation. That is to say, the body screen 56 has traveled to the left of FIG. 16, as indicated by the arrow 258, and is now in its extreme left-hand position. Similarly, the bottle B′ has traveled to the left of FIG. 16 through the distance 96 while simultaneously being rotated through 360°. The mean diameter of the neck portion of the bottle B′ is such that its circumference is less than the distance 96. Therefore, the length of the design provided on the shoulder screen 58 will be less than the distance 96 and is indicated by the dimension line 260. Since the design length 260 is less than the distance 96 through which the bottle B' moves, the shoulder screen 58 must be moved through a distance corresponding to the difference between the design length 260 and the distance 96. In this instance, the shoulder screen 58 must be moved with the bottle B' through the distance indicated by the dimension line 262, which distance 262 is substantially equal to the difference between the design length 260 and the distance 96.

Since the shoulder screen 58 must move with the bottle B', the connecting block 238 must be positioned at a point beyond the second vertical drive shaft 54 as shown in FIG. 16. When the oscillating arm 230 is oscillated, the connecting bar 242 will be oscillated in a manner such that the shoulder screen 58 moves with the bottle B' during a decorating operation and moves opposite to the direction of travel of the bottle B' when returning to its initial position preparatory to decorating the next successive bottle B.

As described above, the construction of the shoulder screen drive mechanism is such that the velocity and direction of travel of the shoulder screen 58 is adjustable as a function of the mean diameter of the neck portion of the bottle to be decorated. In the extreme condition illustrated in FIGS. 15 and 16, the body screen 56 is moved to the right of FIG. 16 as indicated by the arrow 224 while the shoulder screen 58 is moved to the left of FIG. 16 as indicated by the arrow 258. In the event the neck portion of the bottle B' has a circumference equal to the distance 96, the connecting block 238 will be aligned with the central axis of the second drive shaft 54 and the shoulder screen 58 will remain stationary during the decorating operation. In the event that the circumference of the neck portion of the bottle B' is greater than the distance 96, the connecting block 238 will be positioned at a location in the guideway 240 between the frame 250 and the drive shaft 254. In this instance, the shoulder screen 58 will move opposite to the travel of the bottle B' during decoration. Also in this instance, the body screen 56 and the shoulder screen 58 will oscillate in the same direction. However, the velocities of the body screen 56 and the shoulder screen 58 will be different since the diameters of the body portion and neck portion of the bottle B will be different.

Although not specifically illustrated herein, a scale plate would be provided at a convenient location on the oscillating arm 242, which scale plate would have scale markings indicating various neck diameters. A pointer would be associated with, for example, the connecting block 238, which pointer would be aligned with an appropriate one of the scale markings which correspond to the mean diameter of the neck portion of the bottle being decorated.

Although the invention has been shown in connection with only one specific embodiment, it will be readily apparent to those skilled in the art that various changes in form and arrangement of parts may be made to suit requirements without departing from the spirit and scope of the invention.

We claim as our invention:

1. In continuous motion decorating apparatus having a decorating screen, a plurality of generally cylindrical workpieces, means for conveying said generally cylindrical workpieces at a constant linear speed, continuously and in succession past said decorating screen for decoration, and means adjacent to said decorating screen for displacing said decorating screen into line contact with the workpiece being decorated while simultaneously forcing a printing medium through said decorating screen onto the outer surface of the workpiece being decorated, the combination comprising: means for moving said displacing and forcing means at said constant linear velocity with the workpiece being decorated; means for rotating the workpiece being decorated at least during its passage past said decorating screen; and means for moving said decorating screen relative to the workpiece being decorated and at a velocity such that there is no relative motion between said decorating screen and the line of the workpiece in contact with said decorating screen.

2. In continuous motion decorating apparatus having a decorating screen, a plurality of generally cylindrical workpieces, means for conveying said generally cylindrical workpieces at a constant linear speed, continuously and in succession past said decorating screen for decoration, and means adjacent to said decorating screen for displacing said decorating screen into line contact with the workpiece being decorated while simultaneously forcing a printing medium through said decorating screen onto the outer surface of the workpiece being decorated, the combination comprising: means for moving said displacing and forcing means at a constant linear velocity with the workpiece being decorated; means for rotating the workpiece being decorated at a constant angular velocity at least during its travel past said decorating screen; means for moving said decorating screen relative to the workpiece being decorated and at a velocity such that there is no relative motion between said decorating screen and the line of the workpiece in contact with said decorating screen; and means operatively connected to said decorating screen moving means for adjusting the velocity of said decorating screen as a function of the diameter of the workpiece body portion being decorated.

3. In continuous motion decorating apparatus having a decorating screen, a plurality of generally cylindrical workpieces, means for conveying said generally cylindrical workpieces at a constant linear speed, continuously and in succession past said decorating screen for decoration, and means adjacent to said decorating screen for displacing said decorating screen into line contact with the workpiece being decorated while simultaneously forcing a printing medium through said decorating screen onto the outer surface of the workpiece being decorated, the combination comprising: means for moving said displacing and forcing means at said constant linear velocity with the workpiece being decorated; means for rotating the workpiece being decorated at a constant angular velocity at least during its travel past said decorating screen; means for moving said decorating screen relative to the workpiece being decorated and at a velocity such that there is no relative motion between said decorating screen and the line of the workpiece in contact with said decorating screen; and means for controlling the direction of travel of said decorating screen relative to the workpiece being decorated, the direction of travel of said decorating screen being a function of the diameter of the workpiece body portion being decorated.

4. In continuous motion decorating apparatus having a decorating screen, a plurality of generally cylindrical workpieces, means for conveying said generally cylindrical workpieces at a constant linear speed, continuously and in succession past said decorating screen for decoration, and means adjacent to said decorating screen for displacing said decorating screen into line contact with the workpiece being decorated while simultaneously forcing a printing medium through said decorating screen onto the outer surface of the workpiece being decorated, the combination comprising: means for moving said displacing and forcing means at a constant linear velocity with the workpiece being decorated; means for rotating the workpiece being decorated at a constant angular velocity at least during its travel past said decorating screen; means for moving said decorating screen relative to the workpiece being decorated and at a velocity such that there is no relative motion between said decorating screen and the line of the workpiece in contact with said decorating screen; means operatively connected to said screen moving means for adjusting the velocity of said decorating screen as a function of the diameter of the workpiece body portion being decorated; and means for controlling the direction of travel of said decorating screen relative to the workpiece being decorated, the direction of travel of said decorating screen being a function of the diameter of the workpiece body portion being decorated.

5. In continuous motion decorating apparatus having a decorating screen, a plurality of generally cylindrical workpieces, means for conveying said generally cylindrical workpieces at a constant linear speed, continuously and in succession to said decorating screen for decoration, and a squeegee positioned to engage said screen and displace the same into line contact with the workpiece being decorated, the combination comprising: means for moving said squeegee at said constant linear speed while displacing said screen into line contact with the workpiece being decorated; means for rotating the workpiece being decorated at a constant angular velocity; means for supporting said decorating screen for reciprocal movement parallel to the travel of the workpiece; and means operatively connected to said support means for moving said decorating screen relative to the workpiece being decorated and at a velocity such that there is no relative motion between said decorating screen and the line of the workpiece in contact with said decorating screen.

6. In continuous motion decorating apparatus having a decorating screen, a plurality of generally cylindrical workpieces, means for conveying said generally cylindrical workpieces at a constant linear speed, continuously and in succession to said decorating screen for decoration, and a squeegee positioned to engage said screen and displace the same into line contact with the workpiece being decorated, the combination comprising: means for moving said squeegee at said constant linear speed while displacing said screen into line contact with the workpiece being decorated; means for rotating the workpiece being decorated at a constant angular velocity; means for supporting said decorating screen for reciprocal movement parallel to the travel of the workpiece; means operatively connected to said screen support means for moving said decorating screen relative to the workpiece being decorated at a linear velocity such that there is no relative motion between said decorating screen and the line of the workpiece in contact with said decorating screen; and means for adjusting the linear velocity of said screen as a function of the diameter of the workpiece being decorated.

7. In continuous motion decorating apparatus having a decorating screen, a plurality of generally cylindrical workpieces, means for conveying said generally cylindrical workpieces at a constant linear speed, continuously and in succession to said decorating screen for decoration, and a squeegee positioned to engage said decorating screen and displace the same into line contact with a workpiece being decorated, the combination comprising: means for moving said squeegee at said constant linear speed while displacing said screen into line contact with the workpiece being decorated; means for rotating the workpiece being decorated at a constant angular velocity; means for supporting said decorating screen for reciprocal movement parallel to the travel of the workpiece; means operatively connected to said screen support means for moving said decorating screen at a velocity such that there is no relative motion between said decorating screen and the line of the workpiece in contact with said decorating screen; and means for controlling the direction of travel of said decorating screen relative to the workpiece being decorated, the direction of travel of said decorating screen being a function of the diameter of the workpiece being decorated relative to a preselected diameter.

8. The combination of claim 7 wherein the diameter of said workpiece is greater than said preselected diameter and said decorating screen is moved in a direction opposite to the direction of travel of the workpieces.

9. The combination of claim 7 wherein the diameter of said workpieces is less than said preselected diameter and said decorating screen is moved in the same direction of travel as the workpieces.

10. In a continuous motion decorating apparatus having a decorating screen, a plurality of generally cylindrical workpieces, means for conveying said generally cylindrical workpieces at a constant linear speed, continuously and in succession to said decorating screen for decoration, and a squeegee positioned to engage said decorating screen and displace the same into line contact with a workpiece being decorated, the combination comprising: means for moving said squeegee at said constant linear speed while displacing said decorating screen into line contact with the workpiece being decorated; means for rotating the workpiece being decorated at a constant angular velocity; means for supporting said decorating screen for reciprocal movement parallel to the travel of the workpieces; means operatively connected to said support means for moving said decorating screen relative to the workpiece being decorated at a linear speed such that there is no relative motion between said decorating screen and the line of the workpiece in contact with said decorating screen; means for adjusting the linear speed of said decorating screen as a function of the diameter of the workpiece being decorated; and means for controlling the direction of travel of said decorating screen relative to the workpiece being decorated, the direction of travel of said decorating screen being a function of the diameter of the workpiece being decorated relative to a preselected diameter.

11. In decorating apparatus of the continuous motion type having a decorating screen, a plurality of generally cylindrical workpieces, means for conveying said generally cylindrical workpieces at a constant linear speed, continuously and in succession to said decorating screen for decoration, and a squeegee positioned to engage said decorating screen and displace the same into line contact with the workpiece being decorated while said squeegee moves with the workpiece, the combination comprising: a crankarm operatively connected in torque-transmitting relation with each workpiece; a rotator in the region of said decorating screen and positioned for engagement by each crankarm; means for guiding each crankarm into engagement with said rotator; means for moving said rotator reciprocably and parallel to the travel of the workpieces whereby said rotator is moved with the workpiece during decoration and thereafter returned to its starting point for engagement by the next successive crankarm; and means for rotating said rotator and hence the workpiece during travel of said rotator with the workpiece.

12. In decorating apparatus of the continuous motion type wherein generally cylindrical workpieces are decorated, said apparatus having a plurality of decorating stations each comprising at least one decorating screen and a squeegee positioned to engage said screen and displace the same into line contact with the workpiece being decorated; and means for conveying a plurality of generally cylindrical workpieces at a constant linear speed, continuously and in succession to said decorating stations for decoration, the combination comprising: a crankarm connected in torque-transmitting relation with each workpiece carried on said conveying means; a rotator disposed in the region of the decorating screen of each of said decorating stations and positioned for engagement by each of said crankarms; means for guiding each crankarm into engagement with the rotator of the first of said decorating stations; means engaged by said crankarm after disengagement with said rotator of said first of said decorating stations for guiding each crankarm into engagement with the rotator of the second of said decorating stations; means for moving each of the rotators reciprocably and parallel to the travel of the workpieces, each rotator being moved with a workpiece during decoration and thereafter returned to its starting point for engagement by the next successive crankarm; and means for rotating each rotator and hence the workpiece associated therewith during travel of the rotator with the workpiece; said workpieces being rotated during decoration and being stationary relative to the conveying means during travel to the first of said decorating stations, between said decorating stations and beyond the last of said decorating stations.

13. In decorating apparatus of the continuous motion type having a decorating screen, a plurality of generally cylindrical workpieces, means for conveying said generally cylindrical workpiece at a constant linear speed, continuously and in succession to said decorating screen for decoration, and a squeegee positioned to engage said decorating screen and displace the same into line contact with the workpiece being decorated while said squeegee moves with the workpiece being decorated, the combination comprising: a crankarm for each workpiece having a first end connected in torque-transmitting relation with the workpiece and a second end remote from said first end; a rotator in the region of said decorating screen; means for guiding the second ends of said crankarms successively into engagement with said rotator; means for moving said rotator reciprocably and parallel to the travel of the workpieces, said rotator being moved with the workpiece being decorated and thereafter returned to its starting point for engagement by the second end of the next successive crankarm; means for rotating said rotator and hence the workpiece being decorated, said workpiece being rotated only during its decoration; means for supporting said decorating screen for reciprocal movement parallel to the travel of the workpieces; and means operatively connected to said screen support means for moving said decorating screen relative to the workpiece being decorated whereby there is no relative motion between the decorating screen and the line of said workpiece in contact with the decorating screen.

14. In decorating apparatus of the continuous motion type having a decorating screen, a plurality of generally cylindrical workpieces, means for conveying said generally cylindrical workpieces continuously and in succession to said decorating screen for decoration, and a squeegee supported to engage said decorating screen and displace the same into line contact with the workpiece being decorated while said squeegee moves with the workpiece being decorated, the combination comprising: a crankarm for each workpiece, said crankarm being connected in torque-transmitting relation with the workpiece; a rotator in the region of said decorating screen; means for guiding the crankarms into engagement with said rotator; means for connecting said rotator to said squeegee for movement therewith reciprocably and parallel to the travel of the workpieces, said rotator being moved with the workpiece during decoration and thereafter returned to its starting point for engagement by the next crankarm; and means for rotating said rotator and hence the workpiece being decorated during travel of said rotator with the workpiece.

15. Decorating apparatus for applying separate decorative imprints simultaneously to different diameter body portions of generally cylindrical workpieces, comprising: means for conveying a plurality of generally cylindrical workpieces along a path of travel and at a constant linear speed, said workpieces being supported for rotation about their longitudinal axes; a pair of squeegees; single means for supporting said squeegees spaced from each other in alignment with the path of travel of said different diameter body portions of said workpieces and for reciprocal movement parallel to the travel of said workpieces; a decorating screen interposed between each of said squeegees and said workpieces; means for supporting each of said screens for reciprocal movement parallel to the travel of said workpieces and independently of each other; means for rotating the workpiece being decorated at a constant angular velocity; means for moving said squeegees simultaneously with a workpiece being decorated while said squeegees displaced said screens into line contact with the different diameter body portions of the workpieces being decorated; means for moving one screen relative to the workpiece being decorated at a velocity such that said one screen is in rolling contact with one of said different diameter body portions; and means for moving the other screen relative to the workpiece being decorated at a velocity such that said other screen is in rolling contact with the other of said different diameter body portions.

16. The decorating apparatus as defined in claim 15 including means for each of said screen moving means for varying the velocity of each screen as a function of the diameter of said different diameter body portions.

17. The decorating apparatus as defined in claim 15 including means associated with at least one of said screen moving means for controlling the direction of travel of the screen relative to the workpiece being decorated as a function of the diameter of the associated body portion.

18. Decorating apparatus for applying separate decorative imprints simultaneously to different diameter body portions of generally cylindrical workpieces, comprising: means for conveying a plurality of generally cylindrical workpieces along a path of travel and at a constant linear speed, said workpieces being supported for rotation about their longitudinal axes; first and second squeegees; means for supporting said first and second squeegees in spaced-apart relation with said first squeegee aligned with the path of travel of one of said body portions of said workpieces and said second squeegee aligned with the path of travel of the other of said body portions of said workpieces, said squeegee support means being movable parallel to the travel of said workpieces and reciprocally between two spaced points; first and second decorating screens interposed between said first and second squeegees respectively and said workpieces, said first and second squeegees bearing the designs to be transferred to said different diameter body portions of said workpieces; means supporting each of said first and second decorating screens respectively for independent movement parallel to the travel of said workpieces and reciprocally thereof; a driving member at one side of said conveying means and spaced therefrom; means for connecting said squeegee support means to said driving member for moving said squeegees reciprocally between said spaced points, said squeegees moving in unison with the workpiece being decorated and thereafter returned to its initial position; means for connecting said first screen support means to said driving member for moving said first screen relative to the workpiece being decorated at a velocity such that said first screen is in rolling contact with said one of said body portions of the workpiece being decorated; and means for connecting said second screen support means to said driving member for moving said second screen relative to the workpiece being decorated at a velocity such that said second screen is in rolling contact with the other of said body portions of the workpiece being decorated; the velocities of said first and second screens being a function of the diameter of said body portions.

19. The decorating apparatus as defined in claim 18 wherein said connecting means of said first and second screen supporting means are individually adjustable to vary the velocity of each screen as a function of the diameter of the body portion being decorated.

20. Decorating apparatus for applying separate decorative imprints simultaneously to different diameter body portions of generally cylindrical workpieces, comprising: means for conveying a plurality of generally cylindrical workpieces along a path of travel and at a constant linear speed, said workpieces being supported for rotation about their longitudinal axes; a drive shaft at one side of said conveying means; means for reciprocating said drive shaft about its longitudinal axis; a cantilever arm extending over said conveyor means; means for connecting said cantilever arm to said drive shaft whereby said cantilever arm is moved reciprocally and parallel to the path of travel of said workpieces; first and second squeegees mounted on said cantilever arm in spaced-apart relation with said first and second squeegees aligned with the paths of travel of said different diameter body portions of said workpieces; means for rotating the workpiece being decorated at a constant angular velocity; first and second decorating screens interposed between said first and second squeegees respectively and said workpieces; means for displacing said first and second squeegees into engagement with said screens thereby displacing said screens into line contact with the body portions of the workpiece being decorated, said squeegees being moved with the workpiece being decorated when displaced into engagement with said screens; first and second carriages supporting said decorating screens for reciprocal movement parallel to the travel of said workpieces and independently of each other; means for connecting said first carriage to said drive shaft whereby said first screen is moved relative to the workpiece being decorated at a velocity such that said first screen is in rolling contact with said one of said body portions of the workpiece being decorated; means for connecting said second carriage to said drive shaft whereby said second screen is moved relative to the workpiece being decorated at a velocity such that said second screen is in rolling contact with the other of said body portions of the workpiece being decorated; said connecting means for each of said first and second carriages being individually adjustable whereby the velocities of said first and second screens may be varied as a function of the diameter of said different diameter body portions.

21. In decorating apparatus of the continuous motion type, having a decorating screen, means conveying a plurality of generally cylindrical workpieces at a constant linear velocity, continuously and in succession to said decorating screen for decoration of a body portion of said workpiece, and a squeegee supported for reciprocal movement parallel to the travel of the workpieces and positioned to engage and displace said decorating screen into line contact with the workpiece being decorated, the combination comprising: means for moving said squeegee at said constant linear speed while displacing said screen into line contact with the workpiece being decorated; means for rotating the workpiece being decorated through 360° and at a constant angular velocity while the workpiece being decorated is conveyed through a distance which is less than the circumference of said body portion to be decorated; means for supporting said decorating screen for reciprocal movement parallel to the travel of the workpieces; and means for moving said decorating screen in a direction opposite to the travel of the workpiece being decorated and at a velocity such that there is no relative motion between said decorating screen and the line of said workpiece in contact with said decorating screen.

22. In decorating apparatus of the continuous motion type, having a decorating screen, a plurality of generally cylindrical workpieces, means for conveying said plurality of generally cylindrical workpieces at a constant linear velocity, continuously and in succession to said decorating screen for decoration of a body portion of said workpiece, and a squeegee supported for reciprocal movement parallel to the travel of each workpiece in position to engage and displace said decorating screen into line contact with the workpiece being decorated, the combination comprising: means for moving said squeegee at said constant linear speed while displacing said screen into line contact with the workpiece being decorated; means for rotating the workpiece being decorated through 360° and at a constant angular velocity while the workpiece being decorated is conveyed through a distance which is greater than the circumference of said body portion to be decorated; means for supporting said decorating screen for reciprocal movement parallel to the travel of the workpieces; and means for moving said decorating screen in the same direction of travel as the workpiece being decorated and at a velocity such that there is no relative motion between said decorating screen and the line of said workpiece in contact with said decorating screen.

23. In continuous motion decorating apparatus having a decorating screen, a plurality of generally cylindrical workpieces, means for conveying said workpieces at a constant linear velocity continuously and in succession to said decorating screen for decoration, and a squeegee positioned to displace said decorating screen into line contact with the workpiece being decorated, the combination comprising: means for moving said squeegee at said constant linear velocity while displacing said screen into line contact with the workpiece being decorated; means for rotating the workpiece being decorated at a constant angular velocity; frame means supporting said decorating screen for reciprocal movement parallel to the path of travel of the workpieces; and means operatively connected to said frame means for moving said decorating screen in a direction and at a velocity relative to the workpiece being decorated such that there is no relative motion between said decorating screen and the line of the workpiece in contact with said decorating screen, said decorating screen moving means comprising a drive shaft extending normal to the plane of said decorating screen; means for oscillating said drive shaft about its longitudinal axis; an oscillating arm secured to said drive shaft for oscillating movement therewith; a connecting bar secured to said frame means and extending beyond said drive shaft; means for pivotally connecting said connecting bar to said oscillating arm; and means associated with said oscillating arm for positioning said pivotal connecting means at a plurality of locations along the length of said oscillating arm; said drive shaft being secured to said oscillating arm at a position intermediate of its ends, the position of said connecting means with respect to said drive shaft determining the direction and velocity of reciprocation of said decorating screen relative to the workpiece being decorated.

24. The combination of claim 23 wherein said connecting means is aligned with said drive shaft whereby said decorating screen remains stationary.

25. The combination of claim 23 wherein said connecting means is positioned between said decorating screen and said drive shaft whereby said decorating screen is moved in a direction opposite to the travel of the workpiece being decorated during a decorating operation.

26. The combination of claim 23 wherein said connecting means is positioned on that end of said oscillating arm remote from said decorating screen whereby said decorating screen is moved with the bottle being decorated during decoration.

27. In the method of decorating generally cylindrical workpieces wherein said workpieces are conveyed at a constant linear speed, continuously and in succession past a decorating screen having a squeegee which displaces the screen into line contact with the workpieces during decoration, the steps comprising: rotating each workpiece through 360° and at a constant angular velocity while passing said decorating screen; moving said squeegee with each workpiece while said squeegee displaces said decorating screen into line contact with each workpiece; moving said decorating screen relative to each workpiece at a velocity such that there is no relative motion between said decorating screen and the line of each workpiece in contact with said screen; and returning said squeegee and said decorating screen to their initial positions at the completion of a decorating operation, preparatory to decorating the next successive workpiece; the movement and the rotation of each workpiece and the movements of said decorating screen and said squeegee taking place simultaneously.

28. In the method of decorating generally cylindrical workpieces wherein said workpieces are conveyed at a constant linear speed, continuously and in succession past a decorating screen having a squeegee which displaces the screen into line contact with said workpieces, the steps comprising: rotating each workpiece at a constant angular velocity and through 360° while moving linearly past said decorating screen through a distance which is different from the circumference of a body portion of said workpiece which is to be decorated; moving said squeegee with each workpiece through said distance while said squeegee displaces said decorating screen into line contact with each workpiece; moving said decorating screen relative to each workpiece at a velocity such that there is no relative motion between said decorating screen and the line of each workpiece in contact with said decorating screen; and returning said squeegee and said decorating screen at the completion of a decorating operation to their initial positions preparatory to decorating the next successive workpiece; the movement and rotation of each workpiece and the movements of said squeegee and said decorating screen taking place simultaneously.

29. In the method of decorating generally cylindrical workpieces wherein said workpieces are conveyed at a constant linear speed, continuously and in succession past a decorating screen having a squeegee which displaces said decorating screen into line contact with the workpieces during a decorating operation, the steps comprising: rotating each workpiece at a constant angular velocity and through 360° while moving linearly past said decorating screen through a distance which is less than the circumference of a body portion of said workpiece which is to be decorated; moving said squeegee with each workpiece through said distance while said squeegee displaces said decorating screen into line contact with each workpiece; moving said decorating screen in a direction opposite to the travel of each workpiece and at a velocity such that there is no relative motion between said decorating screen and the line of each workpiece in contact with said decorating screen; and returning said squeegee and said decorating screen at the completion of a decorating operation to their initial positions preparatory to decorating the next successive workpiece; the movement and the rotation of each workpiece and the movements of said squeegee and said decorating screen taking place simultaneously.

30. In the method of decorating generally cylindrical workpieces wherein said workpieces are conveyed at a constant linear speed, continuously and in succession past a decorating screen having a squeegee which displaces said decorating screen into line contact with the workpieces during a decorating operation, the steps comprising: rotating each workpiece at a constant angular velocity and through 360° while moving linearly past said decorating screen through a distance which is greater than the circumference of a body portion of said workpiece which is to be decorated; moving said squeegee with each workpiece through said distance while said squeegee displaces said decorating screen into line contact with each workpiece; moving said decorating screen in the same direction of travel as each workpiece and at a velocity such that there is no relative motion between said decorating screen and the line of each workpiece in contact with said decorating screen; and returning said squeegee and said decorating screen at the completion of a decorating operation to their initial positions preparatory to decorating the next successive workpiece; the movement and the rotation of each workpiece and the movements of said squeegee and said decorating screen taking place simultaneously.

31. In the method of decorating generally cylindrical workpieces wherein said workpieces are conveyed at a constant linear speed, continuously and in succession past spaced decorating screens having squeegees which displace each screen into line contact with different diameter body portions of successive ones of said workpieces during decoration, the steps comprising: rotating each workpiece at a constant angular velocity and through 360° while moving linearly past said decorating screens through a distance which is different from the circumference of at least one of said different diameter body portions; moving said squeegees with each workpiece through said distance while said squeegees displace said decorating screen into line contact with said different diameter body portions of successive ones of said workpieces; moving each of said decorating screens relative to each workpiece at a velocity such that said decorating screens are in rolling contact with the different diameter body portions being decorated; and returning said squeegees and said decorating screens at the completion of a decorating operation to their initial positions preparatory to decorating the next successive workpiece; the movement and the rotation of each workpiece and the movements of said squeegees and said decorating screens taking place simultaneously.

References Cited by the Examiner

UNITED STATES PATENTS 3,199,448  8/1965  Jaffa et al. __________ 101—123
3,199,449  8/1965  Jaffa et al. __________ 101—129

DAVID KLEIN, *Primary Examiner.*